Oct. 6, 1964 F. J. WINCHELL ETAL 3,151,497
TRANSMISSION SHIFTER CONTROLS
Filed April 17, 1961 3 Sheets-Sheet 1

INVENTORS
Frank J. Winchell &
BY George Caramanna
Hugh L. Fisher
ATTORNEY

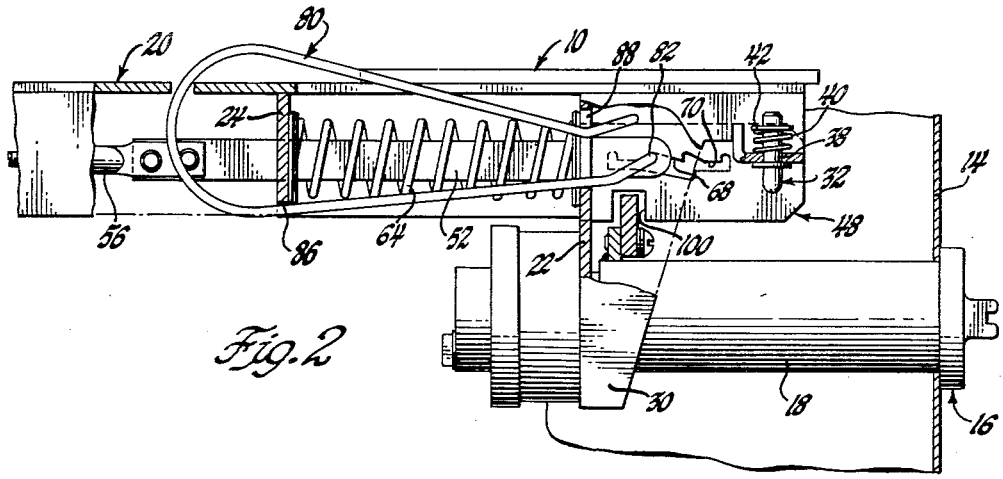
Fig. 2
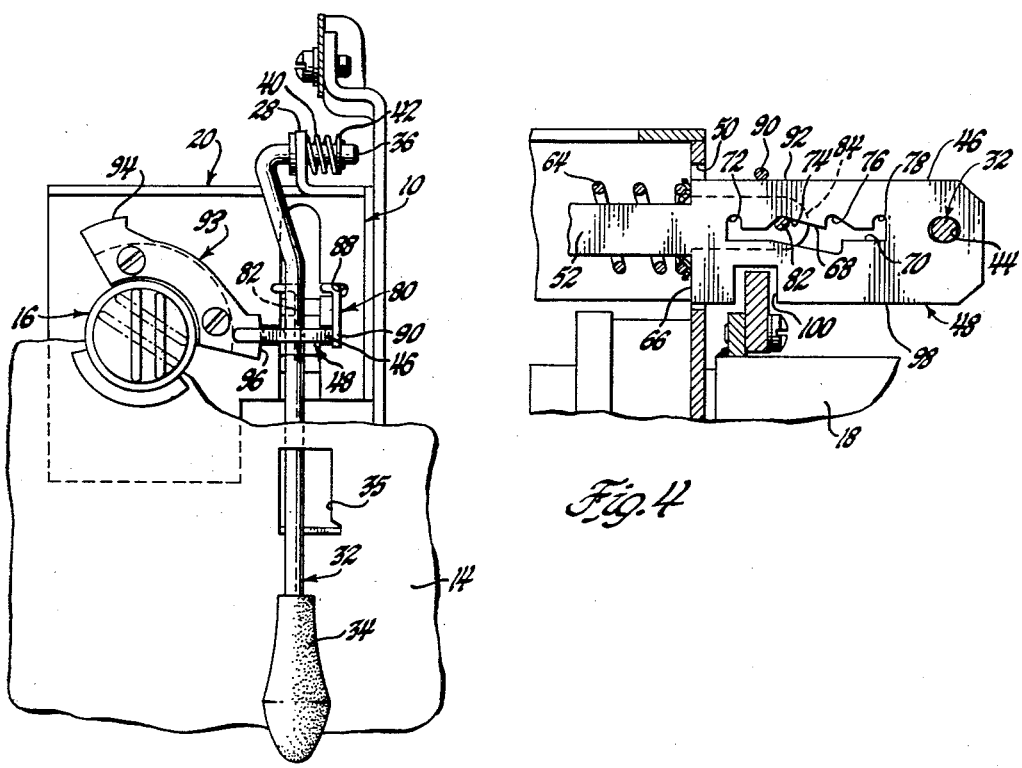
Fig. 3
Fig. 4

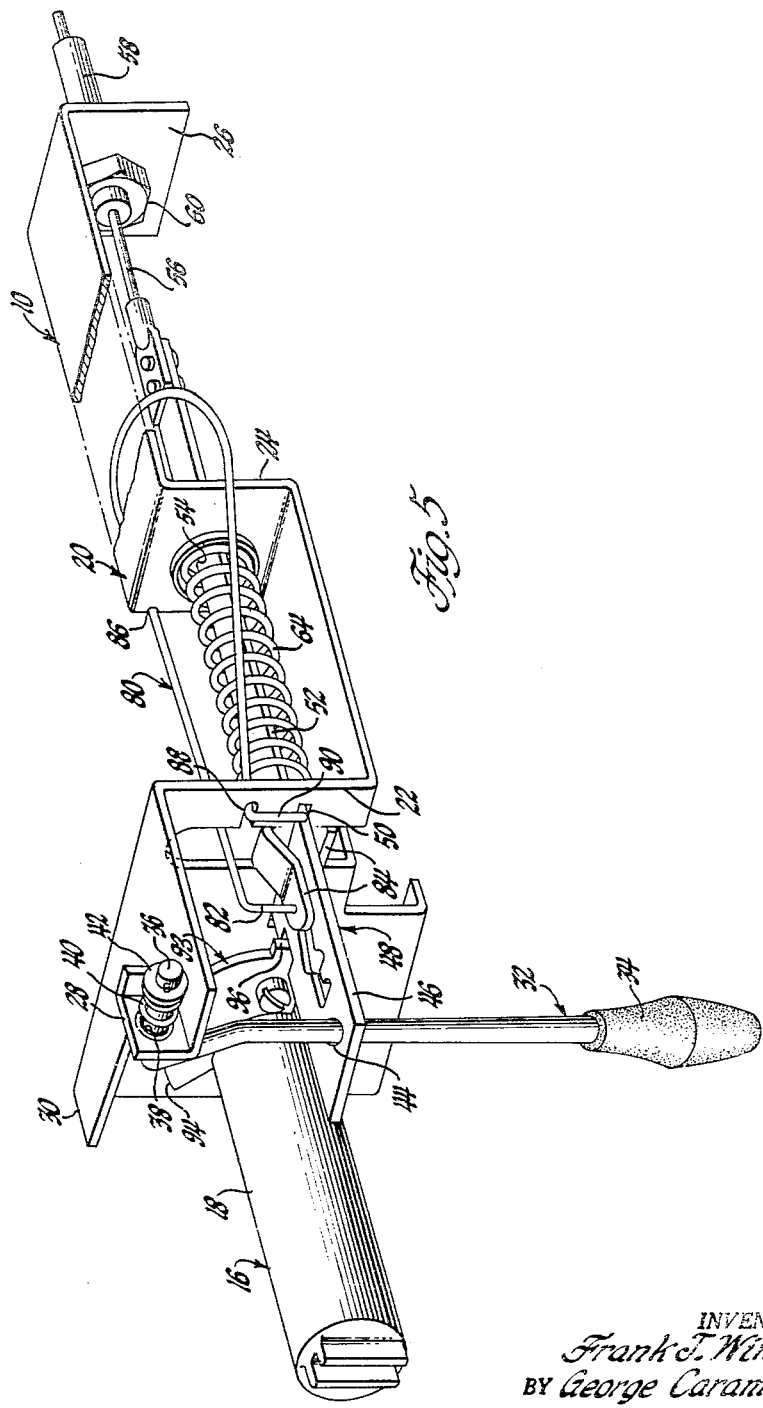

United States Patent Office 3,151,497
Patented Oct. 6, 1964

3,151,497
TRANSMISSION SHIFTER CONTROLS
Frank J. Winchell, Bloomfield Hills, and George Caramanna, Detroit, Mich., assignors to General Motors Corporation, Detroit, Mich., a corporation of Delaware
Filed Apr. 17, 1961, Ser. No. 103,490
14 Claims. (Cl. 74—472)

This invention relates generally to manually operable controls and paritcularly to improvements in shifter controls adapted for use, although not exclusively, with vehicle transmissions.

In those vehicles incorporating automatic transmissions, it is customary to prevent the vehicle operator from starting the engine until the transmission is conditioned for a so-called Neutral status. Without such a provision, it would be possible for the operator to start the engine while the transmission was prepared for either forward or reverse drive. As a consequence, upon starting the engine, the vehicle could lurch out of control and produce undesirable consequences.

For this reason, it has been customary to require prior to completing the engine cranking motor circuit that not only the ignition switch be closed but also another series switch be closed by movement of the transmission shifter lever to the Neutral setting. Therefore, this provision merely acted as a reminder.

Accordingly, one of the purposes of this invention is to eliminate the need for any reminder to the vehicle operator that the transmission must be placed in the Neutral setting before starting the engine. In accomplishing this, the invention further contemplates utilizing the act of starting the engine for also conditioning the transmission for neutral or no-drive operation in a positive manner. Specifically, the invention seeks to provide a shifter control that will automatically be placed in the Neutral setting whenever the vehicle engine is started.

Anti-theft provisions are always desirable with motor vehicles and consequently are always a consideration in any design, but any such anti-theft construction usually requires a separate device that not only increases the complexity but also the cost of the vehicle. For overcoming this problem, the invention also contemplates a unique mode of locking the transmission in the Neutral or inoperative setting, thereby further discouraging theft of the vehicle. By the invention, a shifter control embodying all of the foregoing features is afforded, that can be operated in conjunction with the ignition switch so that when the ignition switch is open, the shifter control will be automatically locked in the Neutral setting without resort to any additional structure or complexity.

The foregoing and other objects and advantages of the invention will be apparent from the following description and the accompanying drawings in which:

FIGURE 2 is a top view of the shifter control looking in the direction of arrows 2—2 in FIGURE 1.

FIGURE 3 is an end view of the shifter control looking in the direction of arrows 3—3 in FIGURE 1;

FIGURE 4 is a fragmentary sectional view of the shifter control taken along line 4—4 of FIGURE 1; and FIGURE 5 is a perspective view of the shifter control.

Figure 1:
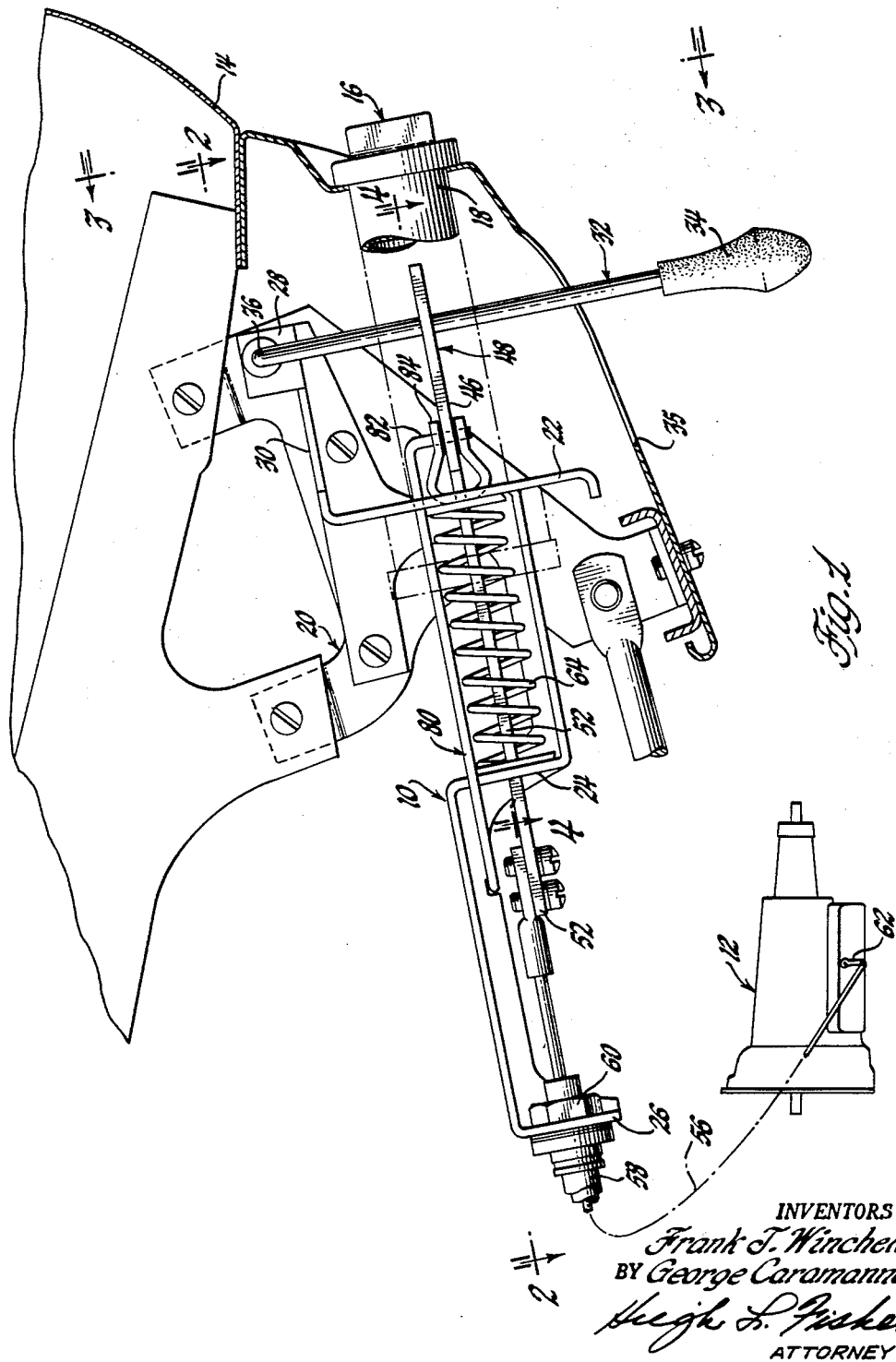
FIGURE 1 is a side view of a shifter control embodying the principles of the invention.

Referring now to the drawings in detail, and particularly FIGURE 1, the numeral 10 designates generally the shifter control to be described, which for demonstration purposes is utilized to operate an automatic vehicle transmission 12. In this embodiment the selector control 10 is mounted on a part of an instrument panel 14 closely adjacent to an ignition switch 16 of the type having the customary key operated cylinder 18. Both the shifter control 10 and the ignition switch 16 are positioned on the instrument panel 14 so as to be accessible to the vehicle operator either for lefthand operation, or righthand operation, or both.

The shifter control 10 is joined to the instrument panel 14 by a support bracket 20, which bracket 20 extends substantially parallel to the longitudinal axis of the vehicle. The support bracket 20 also serves as a mounting for the cylinder 18, this being one of the functions of a front flange 22 to which the cylinder 18 is revolvably joined in any appropriate way. The support bracket 20 additionally has intermediate and rear flanges 24 and 26 successively spaced from the front flange 22. This disposition can be seen in either FIGURE 1 or 5.

From an inspection of FIGURE 5, it will be noted that the front flange 22 on the support bracket 20 has an upright tab 28 formed on a forwardly extending section 30 thereof. This tab 28 serves as a pivotal mounting for a downwardly extending shifter lever 32.

FIGURES 1 and 5 offer the best portrayal of the shifter lever 32, which includes a handle 34 that extends through an opening 35 in the instrument panel 14 and an offset end 36 that extends into an opening 38 in the tab 28. A coil spring 40 is positioned on the offset end 36 between a face of the tab 28 and an axially fixed spacer 42 so that the shifter lever 32 can be moved sidewise to a limited extent as well as fore and aft. The reasons for this will become more apparent.

The shifter lever 32 between the offset end 36 and the handle 34 is confined within an opening 44 in a front wide part 46 of a transfer lever 48 arranged to slide back and forth in a slot 50 provided therefor in the bracket 20. The transfer lever wide part 46 terminates into a narrow part 52 that in turn extends through an opening 54 in the support bracket intermediate flange 24 and is attached to the upper end of a cable 56. The cable 56 as shown in FIGURES 1 and 5 is enclosed by a sheath 58 attached at 60 to the rear flange 26 of the bracket 20 and is at the lower end joined to an external transmission control lever 62. The transmission control lever 62 determines in a known way the operating statuses of the transmission 12, which may include, e.g., Reverse, Neutral, Drive, and Low Ranges of operation.

In again considering FIGURE 5, it will be observed that a neutralizing spring 64 surrounds the narrow part 52 of the transfer lever 48 and is interposed between the two support bracket flanges 22 and 24. At the junction of the wide part 46 and the narrow part 52 of the transfer lever 48, an abutment shoulder identified by the numeral 66 is formed as viewed in FIGURE 4 and is employed to compress the spring 64 whenever the transfer lever 48 is shifted so as to move the abutment shoulder 66 into the space between the flanges 22 and 24. In the absence of any restraint, the spring 64 will be sufficiently preloaded to align the abutment shoulder 66 with the inside face of the flange 22 and in this way will always, as will become evident, return the transfer lever 48 to the Neutral setting.

The shifter lever 32 is releasably maintained in different settings corresponding to the suggested Reverse, Neutral, Drive, and Low Range statuses for the transmission 12 by the detent provision incorporated in the transfer lever 48. As can be viewed in FIGURE 4, the wide part 46 of the transfer lever 48 is provided with a detent surface 68 along the edge of a detent slot 70 therein. This detent surface 68 includes stops or recesses 72, 74, 76, and 78 representing, respectively, the Reverse, Neutral, Drive, and Low settings for the shifter lever 32. The releasable restraint is afforded by a U-shaped bias element 80, one end 82 of which is positioned within the detent slot 70 and maintained fixed relative to the support bracket 20 by spaced ears 84 extending from the front flange 22 of the bracket 20 and positioned on each side of the wide part 46 of the transfer lever 48 as seen in FIGURES 1 and 5. In addition to the connection to the bracket 20 furnished by the ears 84, the bias element 80 is further supported upon the bracket 20 at 86 and 88, respectively, on the flanges 24 and 22 so that the bias element 80 is under tension and has the free or bias end 90 therefor in engagement with an edge 92 of the transfer lever 48 so that the detent surface 68 is maintained in engagement with the fixed end 82.

With the aforedescribed structure, movement of the shifter lever 32 from the Neutral setting illustrated in FIGURE 4 requires only that the lever 32 be moved in the desired direction of movement of the vehicle. Assuming that reverse vehicle movement is wanted, then the shifter lever 32 is moved rearwardly. The force applied to the shifter lever 32 will cause the transfer lever 48 to move so that the detent surface 68 will travel along the edge of the fixed end 82 of the bias element 80 until the recess 72 is engaged by the fixed end 82. In moving to the Reverse setting, the detent surface 68 will cause the shifter lever 32 to be moved sidewise slightly, this being permitted by the spring 40 mounted on the offset end 36 of the lever 32. The force afforded by the bias end 90 of the bias element 80 will maintain the shifter lever 32 in this Reverse setting until the shifter lever 32 is moved forwardly either to obtain Neutral or forward drive.

The initial movement of the shifter lever 32 in proceeding from the Reverse setting to either the Drive or the Low Range settings requires that the shifter lever 32 be moved slightly sidewise so as to free the fixed end 82 of the biased element 80 from the recess 72 in the transfer lever 48. When free, the neutralizing spring 64 will immediately be effective to return the transfer lever 48 to the Neutral setting since the spring 64 will previously have been slightly compressed. This is because the narrow part 52 of the transfer lever 48 at the flange 24 has a suitable abutment, functioning to hold the spring 64 in the same manner as abutment shoulder 66, to result in the slight compression.

If low Range operation is desired, the shifter lever 32 is moved forwardly to the full extent permitted by the detent surface 68 until the fixed end 82 of the bias element 80 engages recess 78. To move out of this Low Range setting, the shifter lever 32 is merely moved sidewise sufficiently for the fixed end 82 to clear the edges of the recesses 78 and then the neutralizing spring 64 will, since it has been compressed, quickly move the shifter lever 32 to the Drive Range setting, this being due to the configuration of the detent surface 68 and the Drive Range setting recess 76. In returning to Neutral, the shifter lever 32 need only again be moved slightly sidewise so that the fixed end 82 clears recess 76, whereupon the spring 64 will take over and return the shifter lever 32 to the Neutral setting. This arrangement affords a desirable Neutral seeking feature to the shifter control 10 in that release of either the Drive Range or Reverse Drive Range settings results automatically in the establishment of Neutral.

Another feature of the construction is the cooperation between the ignition switch 16 and the shifter control 10. To describe this, reference is first made to FIGURE 3 where, as can be observed, the cylinder 18 for the ignition switch 16 has joined thereto a cam 93 provided with angularly spaced neutral shifter and neutral locking lobes 94 and 96. These lobes 94 and 96 are so arranged as to bear against an edge 98 on the wide part 46 of the transfer lever 48 during rotation of the cylinder 18 by the usual key. Also, the edge 98 is formed with a locking portion, as notch 100, which in the Neutral setting of the shifter lever 32 is aligned with the neutral locking lobe 96 as illustrated in FIGURES 3 and 4.

To describe this latter feature, it is assumed that the shifter lever 32 is in some setting other than Neutral and that it is desired to start the vehicle engine. To do this, the cylinder 18 will have to be rotated clockwise by the usual ignition key to the engine starting position shown by the broken lines in FIGURE 3. This causes the neutral shifter lobe 94 to be urged against the edge 98 of the transfer lever 48 and force the transfer lever 48 rightwardly from the FIGURE 3 position until the fixed end 82 of the bias element 80 is free from one of the recesses whereupon the neutralizing spring 64 will return the shifter lever 32 and transfer lever 48 to the Neutral setting. This affords a positive way of coordinating the act of starting the engine with the placing of the automatic transmission 12 in the Neutral setting, for the engine cannot be started without rotating the cylinder 18 the necessary angular amount and this act through the cam 93 causes the shifter lever 32 to be placed in the Neutral setting, if the lever 32 had been in some other setting.

Also to be considered is the act of turning the cylinder 18 counterclockwise to the ignition Off or the position in which the ignition switch 16 will be open and stop operation of the engine. In this arrangement this act causes the neutral locking lobe 96 to engage the edge 98 on the transfer lever 48 and as before shift the transfer lever 48 rightwardly from the FIGURE 3 position a sufficient amount to cause the fixed end 82 of the bias element 80 to be freed from one of the recesses, assuming that the transmission is not in Neutral and as before the neutralizing spring 64 will return the shifter lever 32 to the Neutral setting. The return of the shifter lever 32 to the Neutral setting now permits the cylinder 18 to be revolved the full extent to the Off position, since the notch 100 will become aligned as demonstrated in FIGURE 4 with the Neutral locking lobe 96 and further interference with this rotation will have been removed.

As can now be appreciated, with the ignition key removed, the cylinder 18 cannot be rotated, and consequently, the disposition of the neutral locking lobe 96 within the notch 100 prevents movement of the shifter lever 32 in either the forward or backward direction to a setting that would enable the transmission to operate. This affords a double prevention against theft; first, the cylinder 18 cannot be operated, and second, the transmission cannot be operated even if the ignition switch 16 is by-passed and the engine started.

Moreover, it can now be appreciated that with this novel arrangement of the shifter control 10, it is possible to obtain a positive neutral safety feature and as well lock the shifter lever 32 in the neutral setting merely by manipulation of the usual ignition key. This has been accomplished without any resort to complexity or numerous additional parts, the extra part only being a single cam, as cam 93.

The invention is to be limited only by the following claims.

We claim:
1. In a transmission shifter control for an engine driven vehicle, the combination of input and output members, the input member being maneuverable to a series of settings and operatively connected to the output member so as to effect movement of the output member to positions corresponding to each of the series of settings for the input member, engine ignition operating means, biasing means effective to place the input member in one of the settings when the engine ignition operating means is moved to one position thereof, and the engine ignition operating means including a cam so arranged that upon movement of the engine ignition operating means to the one position the input member is effectively conditioned by the cam for placement in the one setting by the biasing means.

2. In a transmission shifter control for an engine driven vehicle, the combination of a shifter member maneuverable to a series of settings, an output member, a transfer element interconnecting the shifter member and the output member, the transfer element having a guide surface formed thereon, an engine ignition operating element, biasing means effective to place the shifter member in one of the settings when the engine ignition operating means is moved to one position thereof, and the engine ignition operating element having a cam surface so arranged that when the engine ignition operating element is moved to the one position, the cam surface engages the guide surface on the transfer element to effectively condition the shifter member for placement in the one setting by the biasing means.

3. In a transmission shifter control for an engine driven vehicle, the combination of a shifter member maneuverable to a series of settings including a neutral setting, an output member, a transfer element interconnecing the shifter member and the output member, the transfer element having guide and detent surfaces formed thereon, a bias element coacting with the detent surface to releasably maintain the shifter member in each of the settings, an engine ignition operating element, biasing means effective to place the shifter member in the neutral setting when the engine ignition operating element is moved to one position thereof, and the engine ignition operating element having a cam surface so arranged that when the engine ignition operating element is moved to the one position the cam surface engages the guide surface on the transfer element to release the shifter member and effectively condition the shifter member for placement in the neutral setting by the biasing means.

4. In a transmission shifter control for an engine driven vehicle, the combination of a support bracket, a manually operable shifter lever having an end thereof pivotally connected to the bracket and being maneuverable to a series of settings including a neutral setting, an output member, a transfer element interconnecting the shifter lever and the output member, the transfer element being connected to the shifter lever between the ends thereof, the transfer element also including a detent surface provided with stops therealong corresponding to each of the series of settings for the shifter lever and a guide surface, a bias element having one end fixedly secured to the support bracket and the other end acting on the transfer element so as to urge the detent surface and the stops into engagement with the fixed end of the bias element thereby releasably maintaining the shifter lever in each of the series of settings, an engine ignition operating element, biasing means effective to place the shifter lever in the neutral setting when the engine ignition operating element is moved to one position thereof, and the engine ignition operating element having a cam surface so arranged that when the engine ignition operating element is moved to the one position the cam surface engages the guide surface on the transfer element to disengage the stops from the fixed end of the bias element so that the shifter lever is released and effectively conditioned for placement in the neutral setting by the biasing means.

5. In a transmission shifter control for an engine driven vehicle, the combination of input and output members, the input member being maneuverable to a series of settings and operatively connected to the output member so as to effect movement of the output member to positions corresponding to each of the series of settings for the input member, engine ignition operating means, biasing means effective to place the input member in one of the settings when the engine operating means is moved to one position thereof, and the engine operating means including a cam so arranged that upon movement of the engine ignition operating means to the one position the input member is effectively conditioned by the cam for placement in the one setting by the biasing means and is thereupon effectively locked in the one setting by the cam.

6. In a transmission shifter control for an engine driven vehicle, the combination of a shifter member maneuverable to a series of settings, an output member, a transfer element interconnecting the shifter member and the output member, the transfer element having a guide surface including a locking detent formed thereon, an engine ignition operating element, biasing means effective to place the shifter member in one of the settings when the engine ignition operating element is moved to one position thereof, and the engine ignition operating element having a cam surface so arranged that when the engine ignition operating element is moved to the one position the cam surface initially engages the guide surface on the transfer element to effectively condition the shifter member for initial placement in the one setting by the biasing means and thereupon engages the locking detent to effectively lock the shifter member in the one setting.

7. In a transmission shifter control for an engine driven vehicle, the combination of a shifter member maneuverable to a series of settings including a neutral setting, an output member, a transfer element interconnecting the shifter member and the output member, the transfer element having a detent surface and a guide surface including a locking detent formed thereon, a bias element coacting with the detent surface to releasably maintain the shifter member in each of the settings, an engine ignition operating element, biasing means effective to place the shifter member in the neutral setting when the engine ignition operating element is moved to one position thereof, and the engine ignition operating element having a cam surface so arranged that when the engine ignition operating element is moved to the one position the cam surface engages the guide surface to release the shifter member for placement in the neutral setting by the biasing means and thereupon engages the locking detent to effectively lock the shifter member in the neutral setting.

8. In a transmission shifter control for an engine driven vehicle, the combination of a support bracket, a manually operable shifter lever having an end thereof pivotally connected to the bracket and being maneuverable to a series of settings including a neutral setting, an output member, a transfer element interconnecting the shifter lever and the output member, the transfer element being connected to the shifter lever between the ends thereof, the transfer element also including a detent surface provided with stops therealong corresponding to each of the series of settings for the shifter lever and a guide surface having a locking detent, a bias element having one end fixedly secured to the support bracket and the other end acting on the transfer element so as to urge the detent surface and the stops into engagement with the fixed end of the bias element thereby releasably maintaining the shifter lever in each of the series of settings, an engine ignition operating element, biasing means effective to place the shifter lever in the neutral setting when the engine ignition operating element is moved to one position thereof, and the engine ignition operating element having a cam surface so arranged that when the engine ignition operating element is moved to the one position the cam surface engages the guide surface to release the transfer element from the stops to effectively condition the shifter lever for placement by the biasing means in the neutral setting and thereupon engages the locking detent to effectively lock the shifter lever in the neutral setting.

9. In a transmission shifter control for an engine driven vehicle, the combination of input and output members, the input member being maneuverable to a series of settings and operatively connected to the output member so as to effect movement of the output member to positions corresponding to each of the series of settings for the input member, engine ignition operating means, biasing means effective to place the input member in one of the settings when the engine ignition operating means is moved to one position and to another position thereof, and the engine ignition operating means being so arranged that upon movement to the one position the input member is effectively conditioned for placement in the one setting by the biasing means and upon movement to the other position the input member is effectively conditioned for placement in the one setting by the biasing means and is thereupon effectively locked in the one setting.

10. In a transmission shifter control for an engine driven vehicle, the combination of input and output members, the input member being maneuverable to a series of settings and operatively connected to the output member so as to effect movement of the output member to positions corresponding to each of the series of settings for the input member, engine ignition operating means, biasing means effective to place the input member in one of the settings when the engine ignition operating means is moved to one position and to another position thereof, and the engine ignition operating means including a cam surface so arranged that upon movement to the one position the input member is effectively conditioned for placement in the one setting by the biasing means and upon movement to the other position the input member is effectively conditioned for placement in the one setting by the biasing means and is thereupon effectively locked in the one setting.

11. In a transmission shifter control for an engine driven vehicle, the combination of a shifter member maneuverable to a series of settings, an output member, a transfer element interconnecting the shifter member and the output member, the transfer element having a guide surface including a locking detent formed thereon, an engine ignition operating element, biasing means effective to place the shifter member in one of the settings when the engine ignition operating element is moved to one position and to another position thereof, the engine ignition operating element having a cam surface so arranged that when the engine ignition operating element is moved to the one position the cam surface engages the guide surface on the transfer element to effectively condition the shifter member for placement in the one setting by the biasing means, and the cam surface on the engine ignition operating element also being arranged so that when the engine ignition operating element is moved to the other position the cam surface again engages the guide surface on the transfer element to effectively condition the shifter member for placement in the one setting by the biasing means and thereupon engages the locking detent to effectively lock the shifter member in the one setting.

12. In a transmission shifter control for an engine driven vehicle, the combination of a shifter member maneuverable to a series of settings including a neutral setting, an output member, a transfer element interconnecting the shifter member and the output member, the transfer element having a guide surface including a locking detent and a detent surface formed thereon, a biasing element coacting with the detent surface to releasably maintain the shifter member in each of the settings, an engine ignition operating element having operative and inoperative settings, biasing means effective to place the shifter member in one of the series of settings when the engine ignition operating element is moved to the operative and inoperative settings, the engine ignition operating element having a cam surface so arranged that when the engine ignition operating element is moved to the operative setting the cam surface engages the guide surface to release the transfer element and effectively condition the shifter member for placement in the neutral setting by the biasing means, and the cam surface on the engine ignition operating element also being arranged so that when the engine ignition operating element is moved to the inoperative setting the cam surface again engages the guide surface to release the transfer element to effectively condition the shifter member for placement in the neutral setting by the biasing means and thereupon engages the locking detent to effectively lock the shifter member in the neutral setting.

13. In a transmission shifter control for an engine driven vehicle, the combination of a support bracket, a manually operable shifter lever having an end thereof pivotally connected to the bracket and being maneuverable to a series of settings including a neutral setting, an output member, a transfer element interconnecting the shifter lever and the output member, the transfer element being connected to the shifter lever between the ends thereof, the transfer element also including a detent surface provided with stops therealong corresponding to each of the series of settings for the shifter lever and a guide surface having a locking detent, a bias element having one end fixedly secured to the support bracket and the other end acting on the transfer element so as to urge the detent surface and stops into engagement with the fixed end of the bias element thereby releasably maintaining the transfer element against one of the stops in each of the series of settings for the shifter lever, an engine ignition operating element having operative and inoperative settings, biasing means effective to place the shifter lever in the neutral setting when the engine ignition operating element is moved to the operative setting and to the inoperative setting, the engine ignition operating element including a cam surface so arranged that when the engine ignition operating element is moved to the operative setting the cam surface engages the guide surface on the transfer element and is effective to cause the shifter element to be released from the stops to permit the biasing means to place the shifter lever in the neutral setting, and the cam surface on the engine ignition operating element also being arranged so that when the engine ignition operating element is moved to the inoperative position the cam surface again engages the guide surface on the transfer element to effectively release the transfer element from the stops to permit the biasing means to place the shifter lever in the neutral setting and thereupon engages the locking detent to effectively lock the shifter lever in the neutral setting.

14. In a transmission shifter control for an engine driven vehicle, the combination of a shifter member and an output member, a transfer element interconnecting the shifter member and the output member, the transfer element including a guide surface provided with a locking portion and a detent slot, the detent slot being provided with a detent surface having recesses therein corresponding to certain ones of the settings, a bias element having a fixed end positioned within the guide slot and a free end so arranged as to act against the transfer element and urge the fixed end of the bias element into engagement with one of the recesses thereby releasably maintaining the shifter member in selected settings thereof, a neutralizing spring so arranged as to always urge the shifter element to the neutral setting thereof, and an ignition operating element having a cam surface thereon positioned adjacent the transfer element guide surface, the ignition operating means including operative and inoperative positions and being so arranged that upon movement to the operative position the cam surface engages the guide surface on the transfer element and causes the transfer element to be released from the selected setting so that the neutralizing spring can return the shifter member to the neutral setting, the ignition operating element cam surface also being arranged so that upon movement of the ignition operating element to the inoperative setting the cam surface again engages the guide surface on the transfer element initially causing the transfer element to be released from restraint by the bias element so as to permit the neutralizing spring to return the shifter member to the neutral setting and subsequently engaging the locking portion of the guide surface so that the shifter member is locked in the neutral setting.

References Cited in the file of this patent
UNITED STATES PATENTS

| | | |
|---|---|---|
| 2,015,834 | Banker | Oct. 1, 1935 |
| 2,826,929 | Lincoln et al. | Mar. 18, 1958 |
| 2,884,802 | Loofbourrow | May 5, 1959 |
| 2,916,031 | Parsons | Dec. 8, 1959 |